GEORGE M. RAMSAY.
Improvement in Elastic Wheel for Vehicles.
No. 126,741.  Patented May 14, 1872.
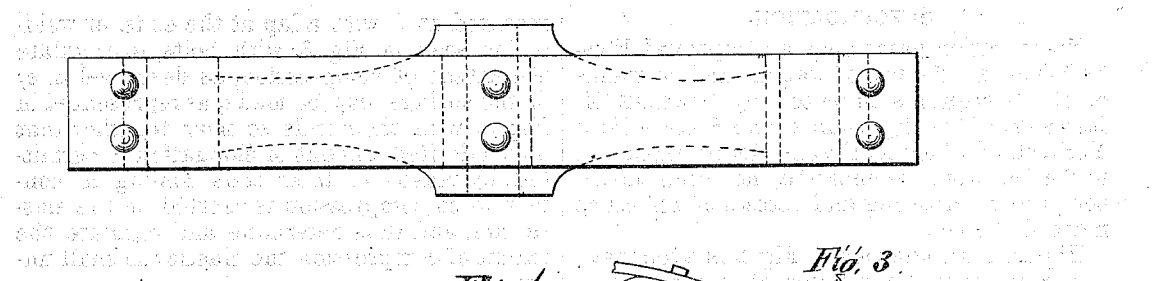
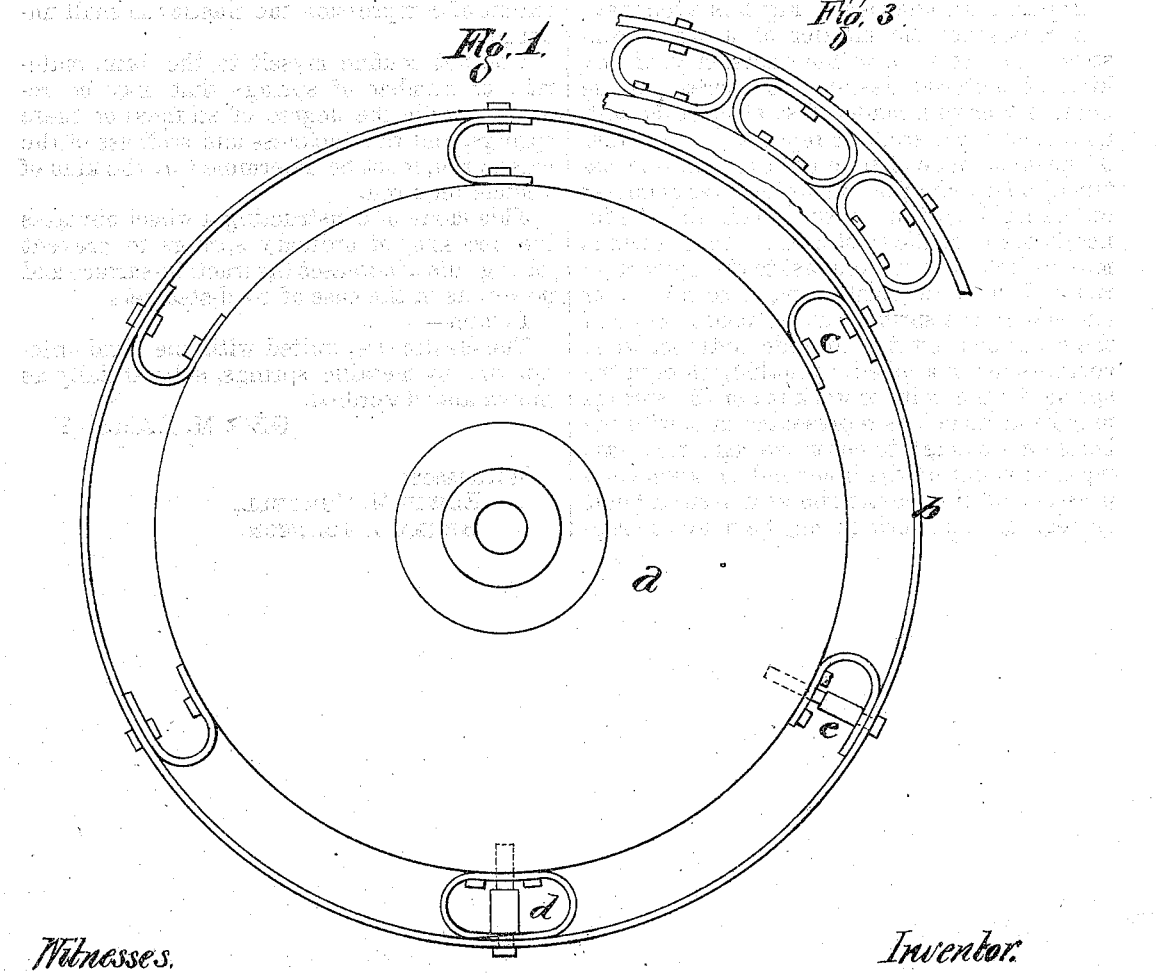
Witnesses.
Edwin M. Coryell
Henry J. Johnson
Inventor.
Geo M Ramsay

126,741

UNITED STATES PATENT OFFICE.

GEORGE M. RAMSAY, OF NEW YORK, N. Y.

IMPROVEMENT IN ELASTIC WHEELS FOR VEHICLES.

Specification forming part of Letters Patent No. 126,741, dated May 14, 1872.

SPECIFICATION.

Specification describing an Improved Elastic Wheel for the use of wagons and carriages of all descriptions, invented by GEORGE M. RAMSAY, of the city, county, and State of New York, all of which is fully and clearly explained in the following specification, including the accompanying drawing and letters of reference marked thereon.

Figure 1 is a side view. Fig. 2 is a top view.

$a$ represents the interior of a wheel constructed so as to be without elasticity, of any kind of material desired. $b$ represents the outer rim or tire, made of steel or other suitable elastic material. $c$ represents a number of springs, made of steel or other suitable material, intervening between the outer diameter of the rigid portion of the wheel and the inner diameter of the elastic tire. These springs may be bolted or riveted fast to the inner rigid rim and the outer elastic rim, as seen at $c$; or one end of the spring may be made fast and the other end left free to glide endwise, when compression is applied, by making slots in the spring for the bolts to work in; or the springs may be attached, as represented at $e$, with the bolts long enough to enter the rigid rim, having a shoulder on the inner end to arrest compression of the elastic rim at a desired point or degree. The springs may be made, as represented at $d$, with a lap at the ends, or welded, as seen in Fig. 3, with bolts to regulate the extent of compression, as described at $e$; or the springs may be made, as represented in Fig. 3, with their ends so near together that only a desired amount of elongation is permitted, by reason of their ends coming in contact when compression is exerted on the elastic rim, and thus determine and regulate the extent of compression the elastic rim shall undergo.

I do not confine myself to the form, material, or number of springs that may be required, while the degree of stiffness of these springs, and the thickness and stiffness of the elastic rim, must be determined by the kind of vehicle required.

This mode of constructing a wheel obviates the necessity of ordinary springs to prevent jolting; also, increases the traction-surface and power, as in the case of road-steamers.

I claim—

The elastic tire, united with the rigid interior rim by metallic springs, substantially as shown and described.

GEO. M. RAMSAY.

Witnesses:
    EDWIN M. CORYELL,
    HENRY J. JOHNSON.